(12) United States Patent
Lin et al.

(10) Patent No.: US 7,318,731 B2
(45) Date of Patent: Jan. 15, 2008

(54) BATTERY LATCH MECHANISM

(75) Inventors: Ke-Cheng Lin, Guangdong (CN);
Wen-Kang Lo, Guangdong (CN);
Chien-Li Tsai, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 56 days.

(21) Appl. No.: 11/308,610

(22) Filed: Apr. 12, 2006

(65) Prior Publication Data
US 2007/0082259 A1 Apr. 12, 2007

(30) Foreign Application Priority Data
Oct. 7, 2005 (CN) .................. 2005 2 0065720 U

(51) Int. Cl.
*H01M 2/10* (2006.01)
(52) U.S. Cl. ...................................... 439/97
(58) Field of Classification Search .......... 429/96–100, 429/123; 439/96–100, 123
See application file for complete search history.

(56) References Cited

U.S. PATENT DOCUMENTS

| 4,943,498 | A | | 7/1990 | Cooper et al. | |
| 5,208,116 | A | * | 5/1993 | Joh | 429/96 |
| 5,225,293 | A | | 7/1993 | Mitchell et al. | |
| 5,716,730 | A | * | 2/1998 | Deguchi | 429/97 |
| 2007/0026297 | A1 | * | 2/2007 | Qin et al. | 429/97 |
| 2007/0026299 | A1 | * | 2/2007 | Park et al. | 429/97 |
| 2007/0048599 | A1 | * | 3/2007 | Choi | 429/97 |

* cited by examiner

*Primary Examiner*—Gary F. Paumen
(74) *Attorney, Agent, or Firm*—Winston Hsu

(57) ABSTRACT

A latch mechanism for securing a battery module (70) includes a bracket (10), and a pair latch members (50). The bracket includes a recess (18), a back plate (16) defining a pair of cutouts (162), and a pair of fixing frame (30) disposed besides the cutouts. Each the fixing frame includes a side panel (322) defining a pair of grooves (322, 324). Each latch member is movably received in the corresponding fixing frames and includes a block (562), and a resilient wall (58) with a protrusion (582) selectively located in the grooves. The battery module is slidably moved into the recess and includes a pair of hooks (74) extending through the cutouts of the bracket to engaging with the blocks of the latch member.

16 Claims, 6 Drawing Sheets

BATTERY LATCH MECHANISM

CROSS-REFERENCES TO RELATED APPLICATION

Relevant subject matter is disclosed in the copending U.S. patent application Ser. No 11/308,473; and the copending U.S. patent application Ser. No. 11/308,473 filed on the same date and having a same title with the present application, which are assigned to the same assignee with this patent application.

FIELD OF THE INVENTION

The present invention relates to latch mechanisms, and particularly to a latch mechanism which can easily secure a battery module in an electronic device.

DESCRIPTION OF RELATED ART

Generally, a potable electronic device, such as a notebook computer, has a battery pack as a power supply for driving source since such a computer is frequently used at a location where no commercial power supply is obtained. The battery pack is detachably contained in a battery receptacle, which is formed in the housing of the notebook computer. Referring to FIG. 6, a conventional battery receptacle 4 is defined in a housing 3. The battery pack 1 is attached/detached to/from the battery receptacle 4 and defines a notch 2 in a side thereof. The housing 3 of the computer has a lock lever 5 to locate in the notch 2 for locking the battery pack 1 to the battery receptacle 4. The lock lever 5 is attached to the housing 3 to be movable between a lock position where the lock lever 5 is engaged on the battery pack 1 and a lock releasing position where the lock lever 5 is detached from the battery pack 1. The lock lever 5 is manually operated via a handle 6. The lock lever 5 of the conventional computer has only the function of locking the battery pack 1 to the battery receptacle 4 and releasing the lock. In addition, it is troublesome to take the battery pack 1 from the housing 3 in a direction perpendicular to the housing 3.

What is desired, therefore, is a latch mechanism easily securing a battery module in an electronic device.

SUMMARY OF INVENTION

In one preferred embodiment, a latch mechanism for securing a battery module includes a bracket, and a pair latch members. The bracket is a part of a housing a notebook computer. The bracket includes a recess, a back plate defining a pair of cutouts, and a pair of fixing frame disposed besides the cutouts. Each the fixing frame includes a side panel defining a pair of grooves. Each latch member is movably received in the corresponding fixing frames and includes a block, and a resilient wall with a protrusion selectively located in the grooves. The battery module is slidably moved into the recess and includes a pair of hooks extending through the cutouts of the bracket to engaging with the blocks of the latch member.

Other advantages and novel features will become more apparent from the following detailed description of preferred embodiments when taken in conjunction with the accompanying drawings, in which:

DETAILED DESCRIPTION

Figure 1:
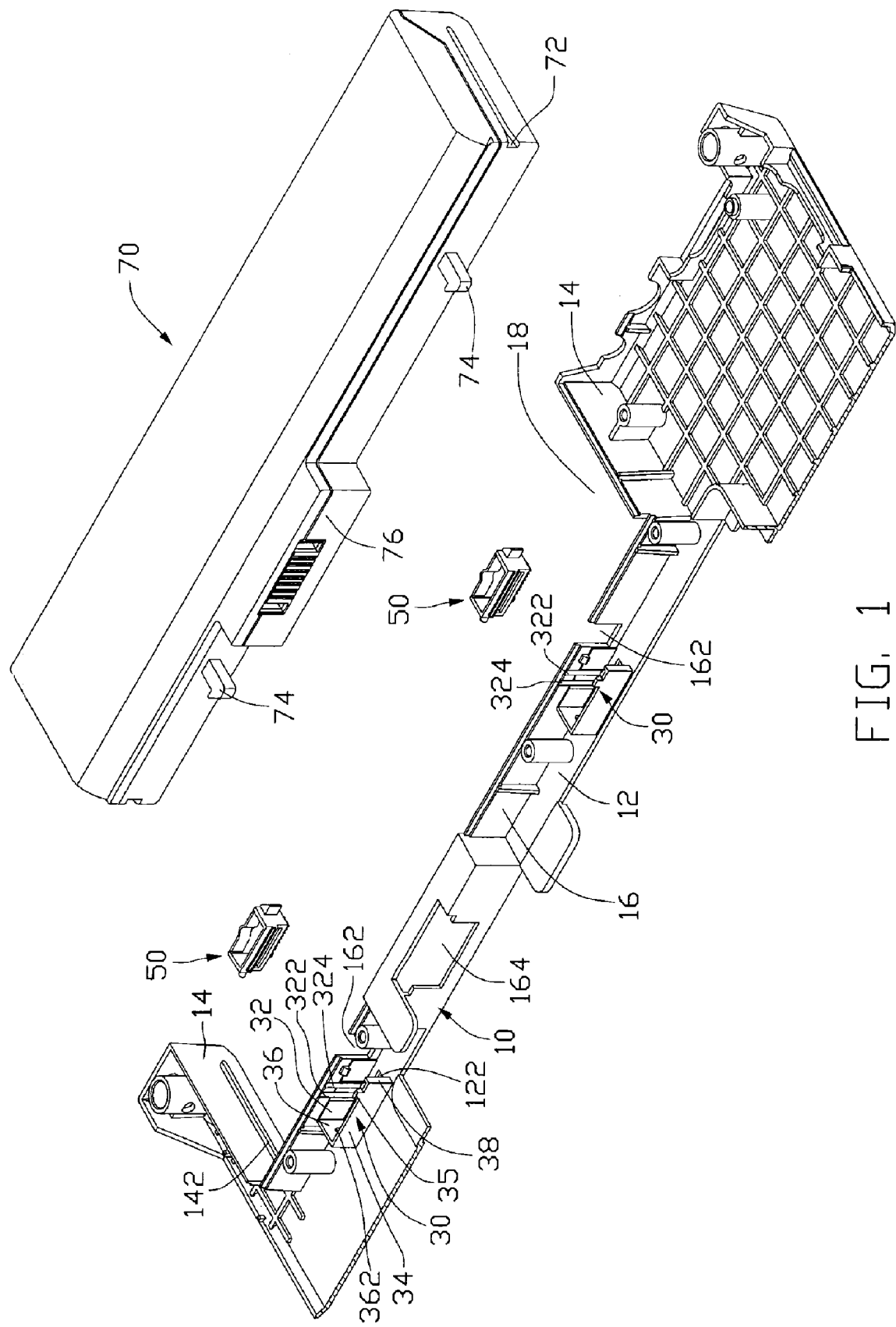
FIG. 1 is an exploded, isometric view of a latch mechanism of a battery module in accordance with a preferred embodiment of the present invention.

Referring to FIG. 1, a latch mechanism in accordance with a preferred embodiment of the present invention is provided for securing a battery module 70 in a housing of a notebook computer. The latch mechanism includes a bracket 10, and a pair of latch members 50 movably attached to the bracket 10. The bracket 10 is a part of the housing of the notebook computer.

The battery module 70 includes a pair of railways 72 defined in two sidewalls thereof, a pair of hooks 74 extending perpendicularly from an inner wall thereof, and an interface 76 arranged between the hooks 74.

The bracket 10 includes a base plate 12, a pair of side plates 14, and a back plate 16. The side plates 14 and the back plate 16 are separately perpendicular to the base plate 12 and cooperatively define a recess 18 for receiving the battery module 70 therein. A pair of sliding bars 142 extrudes from the side plates 12, corresponding to the slideways 72 of the battery module 70. A pair of cutouts 162 is defined in the back plate 16, for the hooks 74 of the battery module 70 extending therethrough. A slot 164 is defined in the back plate 16 between the cutouts 162, for the interface 76 of the battery module 70 extending therethrough.

The back plate 16 further includes a pair of fixing frames 30 disposed besides the cutouts 162, for receiving the latch members 50. The fixing frames 30 stand perpendicularly on the base plate 12. Each of the fixing frames 30 includes a first side panel 32, a second side panel 34, an end panel 36, and a flange 38. The first side panels 32 align with the back plate 16. In this preferred embodiment, the first side panels 32 integrate with the back plate 16. The first and second side panels 32, 34 are separately perpendicular to the base plate 12. The first side panels 32 are parallel to the corresponding second side panels 34. The flanges 38 extend perpendicularly from side edges of the second side panel 34. A pair of grooves 322, 324 is defined in the back plate 16 and extends to the first side panel 32 of each of the fixing frames 30. The grooves 322 are near the corresponding slots 162 of the bracket 10. The grooves 324 are far away to the corresponding slots 162 of the bracket 10. A pair of catches 35 extends from top edges of the first and second side panels 32, 34 of each of the fixing frames 30. A notch 122 is defined in the base plate 12 surrounded by each of the fixing frames 30.

Figure 2:
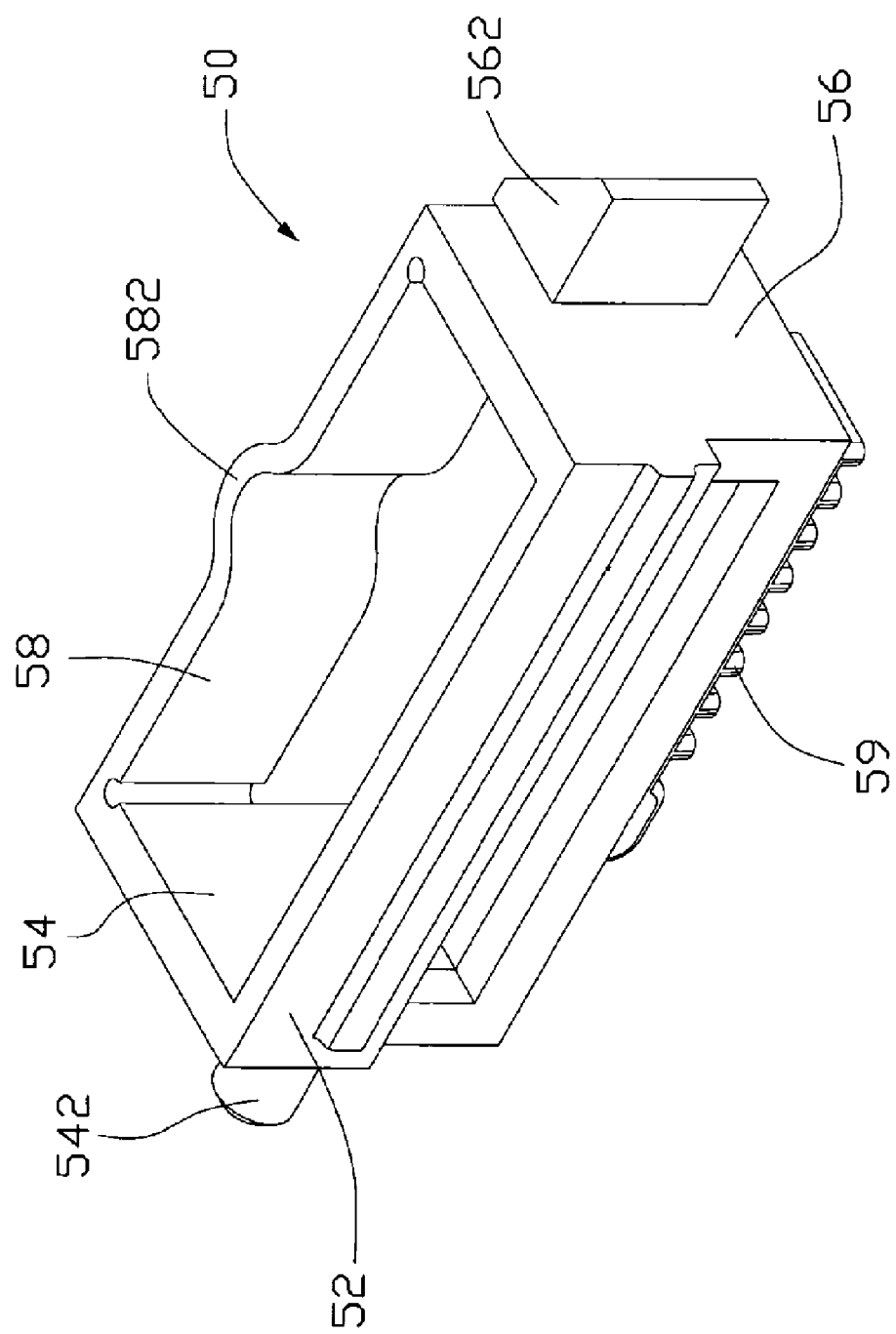
FIG. 2 is an enlarged, isometric view of a latch member of the latch mechanism of FIG. 1.
Figure 3:
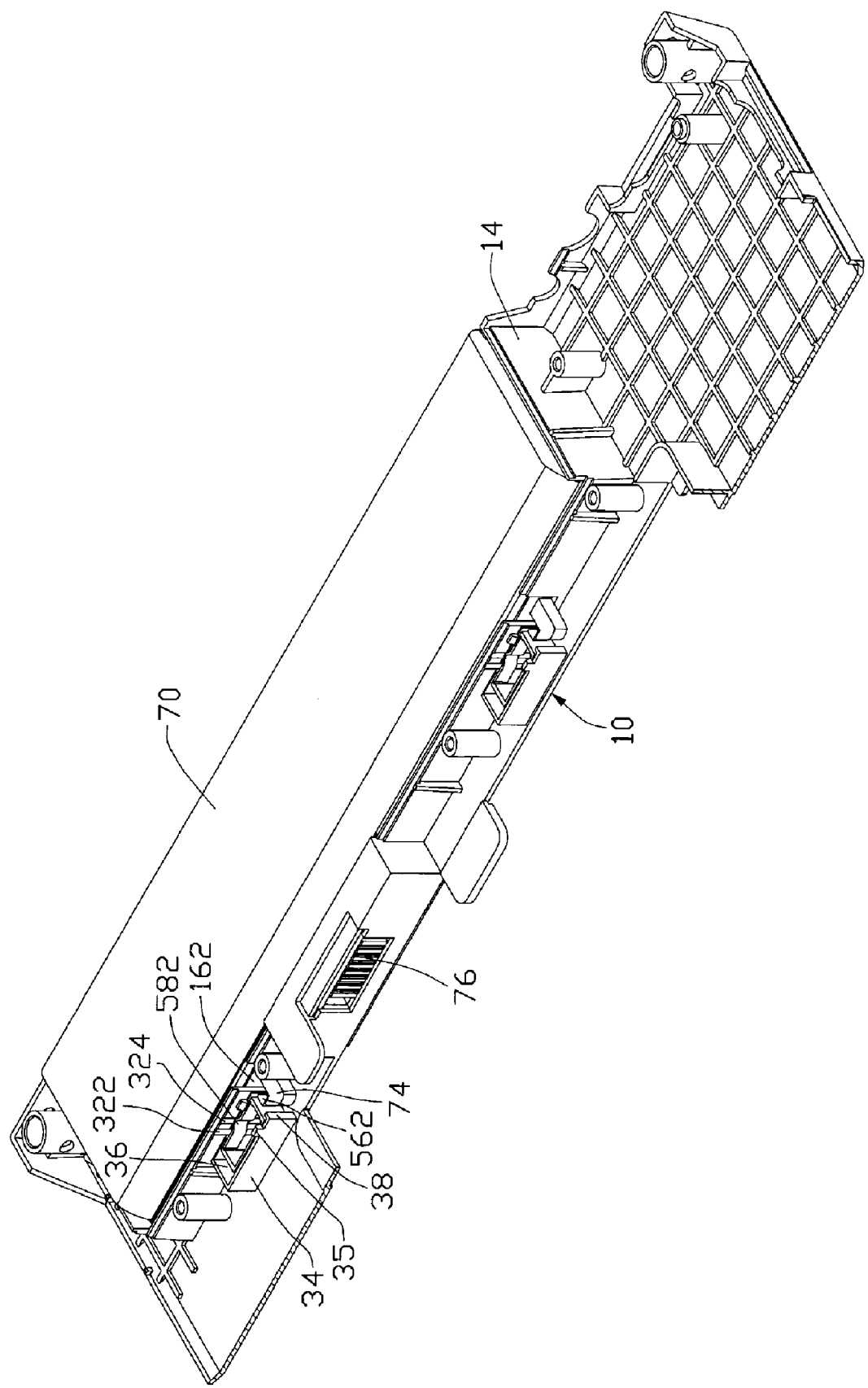
FIG. 3 and FIG. 4 are assembled view of FIG. 1, showing the latch mechanism in a locking and an unlocking states respectively.
Figure 4:
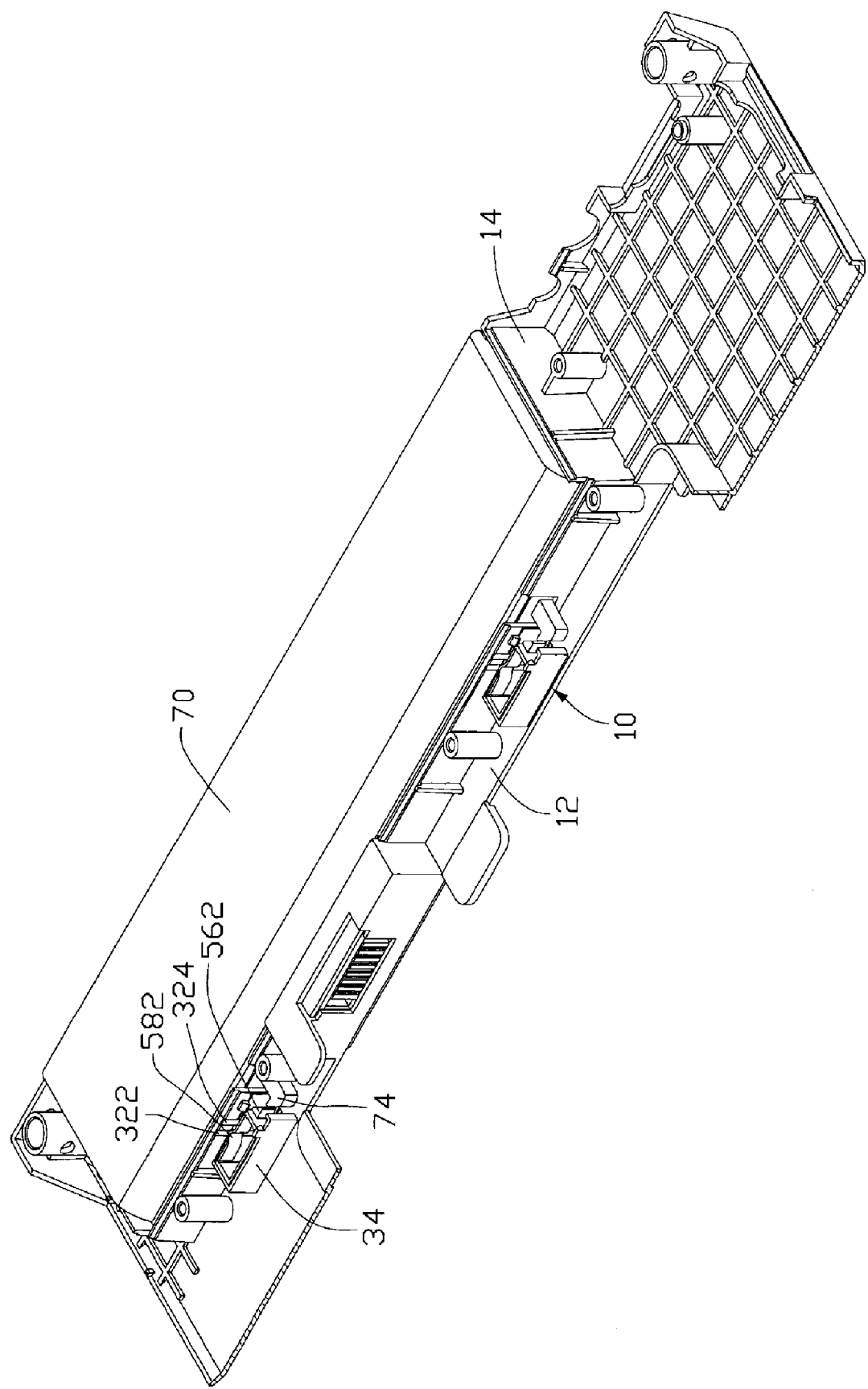
Figure 5:
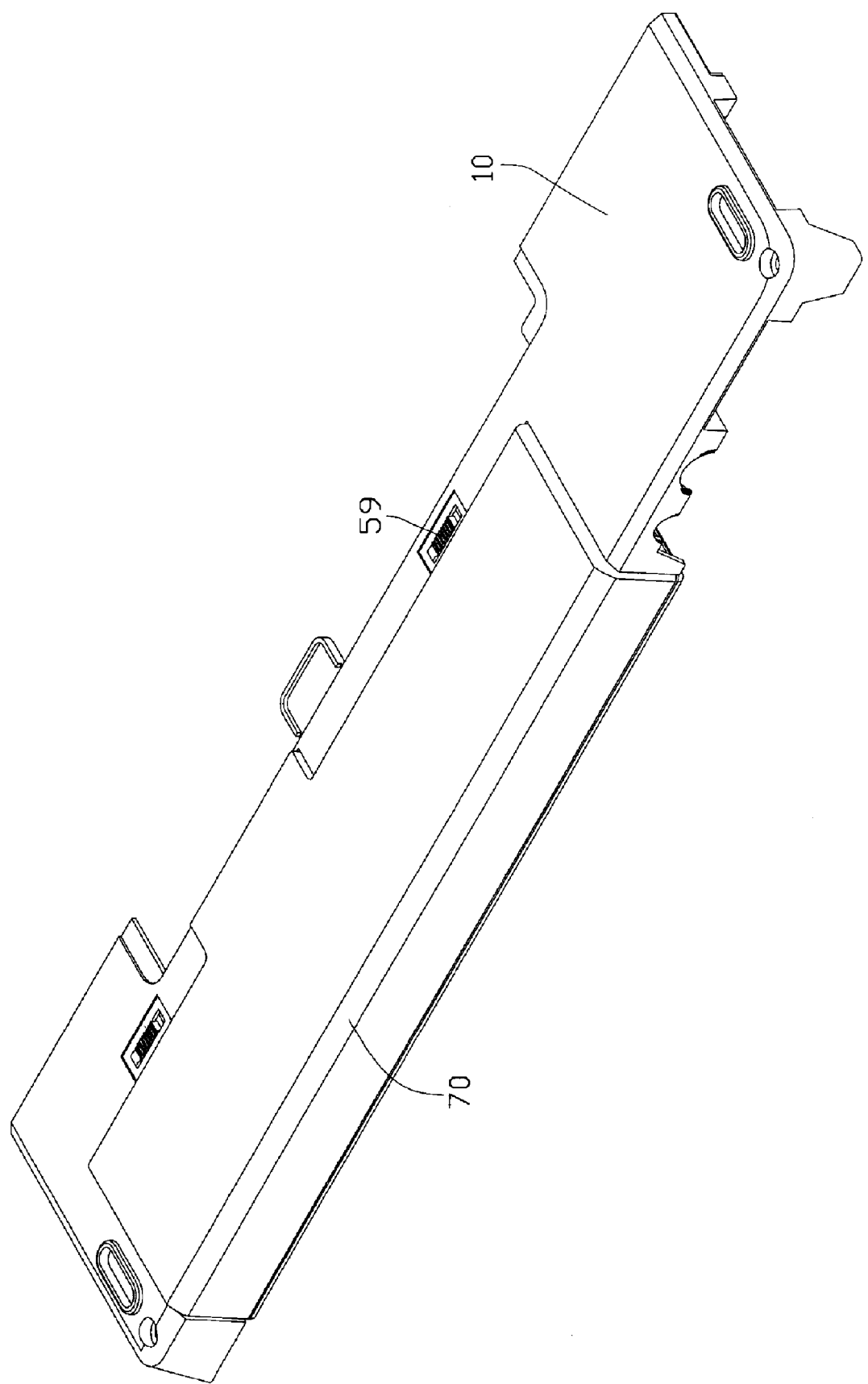
FIG. 5 is assembled view of FIG. 1, but viewed from another aspect.
Figure 6:
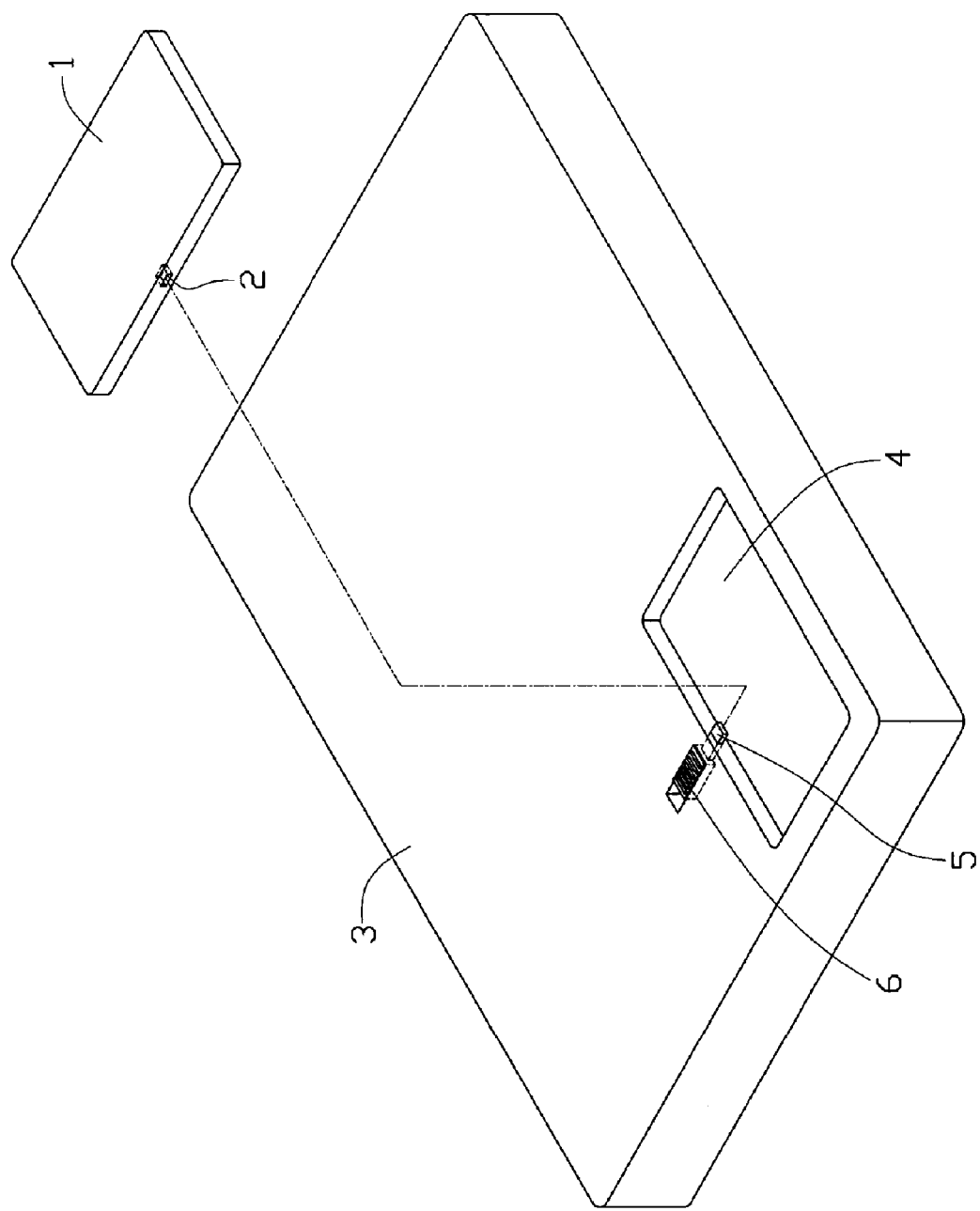
FIG. 6 is an exploded, isometric view of a conventional latch mechanism of a battery module.

Referring to FIG. 2 and FIG. 5, each latch member 50 has a box configuration and includes a first end wall 54, a second end wall 56, a sidewall 52, a resilient wall 58, and a bottom wall with a grip portion 59. The first end walls 54 are parallel to the corresponding second end walls 56. The sidewalls 52 are perpendicularly disposed between the first and second end walls 54, 56 of the latch members 50. The resilient walls 58 are resiliently disposed between the corresponding first and second end walls 54, 56. A block 562 extends from the first end wall 54 of each of the latch members 50, engaging with a corresponding hook 74 of the battery module 70. A post 562 extends from the second end wall 56, extending through the through hole 362 of the corresponding fixing frame 30. The resilient wall 58 forms a protrusion 582, for selectively engaging in the locating grooves 322 and 324 of the fixing frames 30.

In assembly, the latch members 50 are separately inserted into the corresponding fixing frames 30. The posts 542 of the latch members 50 engage in the through holes 362 of the fixing frames 30. The grip portions 59 extend into the notches 122 of the base plate 12 of the bracket 10. The catches 35 of the fixing frames 30 engage top edges of the sidewalls 52 and the resilient walls 58 of the latch members 50. The locating protrusions 582 of the latch members 50 are located in the grooves 324.

In use, the battery module 70 is moved into the recess 18 of the bracket 10, with the sliding bars 142 sliding in the railways 72. The interface 76 of the battery module 70 extends into the slot 164 of the back plate 16. The hooks 74 of the battery module engage the blocks 562 of the latching members 50 to move the corresponding latch members 50 further into the corresponding fixing frames 30, with the resilient walls 58 deformed and the protrusions 582 moving from the grooves 324 to the grooves 322. When the hooks 74 ride over the blocks 562, the resilient walls 58 rebound, the protrusions 582 move back to the grooves 324. The hooks 74 engage with the block to secure the battery module 70 in the bracket 10.

To detach the battery module 70 from the bracket 10, the grip portions 59 of the latch members 50 are operated to move the blocks 562 away from the hooks 74 of the battery module 70 to easily slide the battery module 70 out of the bracket 10. The resilient wall 58 is deformed and the protrusions 582 move from the grooves 324 to the grooves 322.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A latch mechanism for securing a battery module with a pair of hooks, the latch mechanism comprising:
   a bracket comprising a recess for slidably receiving the battery module therein, a back plate, and a pair of fixing frames, the back plate defining a pair of cutouts for the hooks extending therethrough, the fixing frames arranged besides the cutouts and each comprising a plurality of panels, a pair of grooves defined in one of the panels;
   a pair of latch members movably received in the fixing frames, each of the latch members comprising a block engaging with the corresponding hook, and a protrusion selectively located in one of the grooves.

2. The latch mechanism as claimed in claim 1, wherein the bracket further comprises a pair of side plates, each of the side plates extrudes a sliding bar for slidably moving the battery module into the recess.

3. The latch mechanism as claimed in claim 1, wherein the bracket further comprises a base plate perpendicular to the back plate, the fixing frames stands perpendicularly on the base plate.

4. The latch mechanism as claimed in claim 3, wherein the panels of the fixing frames comprises a first side panel, a second side panel, and an end panel, the first and second side panels are parallel to the back plate, the end panel is perpendicularly to back plate.

5. The latch mechanism as claimed in claim 4, wherein the grooves are defined in the first side panel of each of the fixing frames.

6. The latch mechanism as claimed in claim 5, wherein each of the latch members comprises a pair of end walls, a sidewall, and a resilient wall, the sidewall and the resilient wall separately disposed between the end walls.

7. The latch mechanism as claimed in claim 6, wherein the block extends from one of the end walls of each of the latching members.

8. The latch mechanism as claimed in claim 6, wherein a post extends from the other end wall of each of the latch members, a through hole is defined in the end panel of each of the fixing frames for the post extending therthrough.

9. The latch mechanism as claimed in claim 6, wherein the protrusions are formed from the resilient walls of the latch members.

10. A latch mechanism assembly comprising:
    a battery module comprises at least one hook extruding from an inner wall thereof;
    a bracket slidably receiving the battery module therein and comprising a back plate, and a base plate perpendicular to the back plate, the back plate defining at least one cutout for said hook extending therethrough, and a pair of grooves; and
    at least one latch member slidably attached to the back plate, said latch member comprising a protrusion selectively located in the grooves, and a block movably engaging with said hook to secure the battery module in the bracket.

11. The latch mechanism assembly as claimed in claim 10, wherein the battery module comprises a pair of slideways defined in sidewalls thereof, the bracket further comprises a pair of side plates, each of the side plates includes a sliding bar engaging in the corresponding railway of the battery module.

12. The latch mechanism assembly as claimed in claim 10, wherein the bracket further comprises at least one fixing frame besides said cutout to receive said latch member therein, said fixing frame comprises a panel integrated with the back plate, the grooves are defined in the panel.

13. The latch mechanism assembly as claimed in claim 10, wherein said latch member comprises a pair of end walls, a sidewall, and a resilient wall, the sidewall and the resilient wall separately disposed between the end walls.

14. The latch mechanism assembly as claimed in claim 13, wherein the block extends from one of the end walls of said latching member.

15. The latch mechanism assembly as claimed in claim 13, wherein a post extends from the other end wall of each of said latch member, a through hole is defined in said fixing frames for the post engaging with the post.

16. The latch mechanism assembly as claimed in claim 13, wherein the protrusion is formed in the resilient walls of said latch member.

* * * * *